United States Patent
Mashita et al.

[19]

[11] Patent Number: 6,130,696
[45] Date of Patent: Oct. 10, 2000

[54] ELASTIC MEMBER FOR INK-JET RECORDING APPARATUS, INK TANK AND INK-JET RECORDING APPARATUS

[75] Inventors: Naruhiko Mashita, Yokohama; Tadashi Utsunomiya, Kamakura; Yoshihide Fukahori, Hachioji, all of Japan

[73] Assignee: Bridgestone Corporation, Tokyo, Japan

[21] Appl. No.: 09/079,284

[22] Filed: May 15, 1998

[30] Foreign Application Priority Data

May 19, 1997 [JP] Japan ..................................... 9-128711
Apr. 6, 1998 [JP] Japan ................................... 10-093140

[51] Int. Cl.$^7$ .................................................. G01D 15/16
[52] U.S. Cl. ................................. 347/86; 347/29; 525/98
[58] Field of Search ............................... 347/86, 33, 29, 347/31; 399/102, 103, 105, 106; 525/88, 95, 98, 314

[56] References Cited

U.S. PATENT DOCUMENTS

| | | |
|---|---|---|
| 4,479,989 | 10/1984 | Mahal . |
| 4,689,640 | 8/1987 | Shimomura . |
| 4,716,183 | 12/1987 | Gamarra et al. . |
| 5,116,902 | 5/1992 | Chapman et al. ..................... 524/579 |
| 5,216,449 | 6/1993 | English ..................................... 347/29 |
| 5,563,637 | 10/1996 | Francis et al. ............................. 347/32 |
| 5,610,238 | 3/1997 | Himes et al. . |

FOREIGN PATENT DOCUMENTS

| | | |
|---|---|---|
| 0 841 174 | 5/1998 | European Pat. Off. . |
| 63-161057 | 7/1988 | Japan . |
| 8-104717 | 4/1996 | Japan . |
| WO 97/00294 | 1/1997 | WIPO . |

*Primary Examiner*—Robert Beatty
*Attorney, Agent, or Firm*—Oblon, Spivak, McClelland, Maier & Neustadt, P.C.

[57] ABSTRACT

There are disclosed an elastic member for an ink-jet recording apparatus which member is composed of a material comprising at least one copolymer (thermoplastic elastomer) constituted of at least one polymer block containing a vinyl aromatic compound as an principal component and at least one polymer block containing a conjugated diene compound as an principal component, the material further having 1–50 parts by weight of a polyolefin resin and 1–500 parts by weight of a softening agent based on 100 parts by weight of the copolymer. The elastic member is well suited for use in an ink tank as an ink tank valve for supplying a recording head with the ink to be filled in the ink chamber, for use as a sealing member which is installed at an ink supply port and prevents the ink from leaking through the ink supply port, and further for use as a sealing member which is installed on the main body of the ink-jet recording apparatus and prevents the ink from leaking through the recording head.

22 Claims, 2 Drawing Sheets

ELASTIC MEMBER FOR INK-JET RECORDING APPARATUS, INK TANK AND INK-JET RECORDING APPARATUS

BACKGROUND OF THE INVENTION

1. Field of the Invention

The present invention relates to an elastic member for an ink-jet recording apparatus, an ink tank and an ink-jet recording apparatus. More particularly, the present invention pertains to an elastic member which is used as an ink tank valve, a sealing member for an ink tank, and the like items in an ink tank to be employed in an ink-jet recording apparatus that records printed letters on a recording medium by supplying a recording head with an ink, and is also used as a sealing member for preventing an ink from leaking through a recording head in the main body of an ink-jet recording apparatus; which can be injection molded by two-color molding method; and which is composed of a material excellent in durability. The present invention relates also to an ink tank using said elastic member; and further to an ink-jet recording apparatus using the same.

2. Description of the Related Arts

An ink-jet recording apparatus has heretofore been equipped with an ink tank which has an ink chamber to be filled in with an ink and an ink supply portion that supplies a recording head portion with an ink. Examples of types of the ink tanks include a type which is constituted so that an ink is supplied to a recording head which is stationarily attached to a carriage, through tubes arranged everywhere in an ink-jet recording apparatus, and an ink tank is freely attachable to and detachable from said apparatus; a type in which an ink tank is constituted integrally with a recording head, and the resultant integrated unit is freely attachable to and detachable from a carriage; and the like types.

In the former type of the tank, an ink is supplied to the recording head by providing a water head difference therebetween, while in the latter type, an ink is supplied to the recording head by providing the ink tank with a negative pressure generation source.

There have frequently been proposed in recent years, the ink-jet recording apparatuses which adopt the latter type of the ink tank from the viewpoints of miniaturizing the apparatus as well as the easiness of maintenance work.

Such an ink tank is required to be capable of favorably supplying an ink in an amount corresponding to the amount of the ink discharged from the recording head at the time of recording, and also to be tree from the leakage of an ink through a discharge port at the time of non-recording.

There is available for example, as an ink tank meeting the above-mentioned requirements, an ink tank in the form of cartridge in which a recording head is integrated with an ink tank, and an absorbent (foam) is filled inside the ink tank. It is made possible by such absorbent filled in an ink tank to maintain the ink meniscus at an stable level at the ink discharge portion of the recording head, and at the same time it is made possible by the capillary power of the absorbent to properly preserve the ink in the ink tank. In this case, it is needed that almost entire inside of the ink tank be filled in with the absorbent. Thus by allowing the absorbent to preserve an amount of ink a slightly less than the maximum preservable amount thereof, the capillary power of the absorbent is utilized to generate a negative internal pressure. It is therefore, made possible to minimize the amount of the ink leaking through the discharge portion of the recording head and through the ink tank portion communicating with the atmosphere, even in the case where a mechanical shock such as vibration or a thermal shock such as temperature variation is applied to the recording head or the ink tank.

The aforesaid method in which the ink tank inside is almost entirely filled with an absorbent involves the problems that the negative pressure of the absorbent increases accompanying the consumption of the ink, and increases the amount of the ink remaining in the ink tank without being supplied to the recording head, thereby bringing about a low utilization efficiency of the ink.

In order to solve such problems, there is proposed for example a cartridge for an ink-jet recording head which cartridge is constituted so that an ink reservoir is separated from a cavity by a wall equipped with a communication opening on the lower side of an ink tank, and an umbrella check valve is installed movably in the communication opening so as to discharge the ink in the ink reservoir into the cavity by opening itself at the point of time when the ink pressure in the ink-jet recording head is lowered, whereby the ink is supplied to the ink-jet recording head [refer to Japanese Patent Application Laid-Open No. 231759/1987 (Sho-62)].

According to the above-mentioned constitution it is made unnecessary to accomodate an absorbent in the cartridge, thereby enabling to enlarge the substantial accomodation capacity of the ink tank. In general, however, a serious problem with the aforesaid constitution remains unsolved in that the umbrella check valve has an offset value which is too high to precisely regulate the amount of the ink to be supplied to the recording head, thus bringing about unfavorable variation in the amount of the ink to be supplied and consequent deterioration of the quality of the printed letters.

There are also problems in the state of the umbrella check valve being opened, that the recording head is completely isolated from the ink reservoir, which increases the pressure in the cavity, destroys the seal at the connection to the recording head, and thereby causes ink leakage when the ink in the cavity is volumetrically expanded by 2 to 5%, approx. owing to the variation in the environmental temperature; and that in the state of the ink tank being mounted on the recording head, the increased pressure as mentioned above is applied as such to the recording head, which makes it impossibe to maintain a negative pressure between the recording head and the ink tank, and thereby causes ink leakage through the recording head.

There is further a problem that since the umbrella check valve is not imparted with a sufficient valve-opening power by several tens millimeter of water columnn that is to be maintained for the purpose of stably supplying the recording head with the ink, there is a fear that the valve is opened in response to the swing of the ink caused by the movement of a carriage, thereby bringing about inferior stability of the printed letters.

In order to solve the foregoing problems involved in such an umbrella check valve in such circumstances, an attempt is made for example to employ an ink tank valve which is installed at the position dividing an ink chamber and an ink supply portion, is moved by the difference in pressure between the ink chamber and the ink supply portion, and supplies the recording head with the ink filled in the ink chamber [refer to Japanese Patent Application Laid-Open No. 174860/1996(Hei-8)].

By equipping the ink tank with such an ink tank valve, it is made possible to certainly supply the recording head with the ink, by surely responding to the slight difference in pressure between the ink tank and the recording head without being influenced by the swing of the ink due to the movement of the carriage, while maintaining the negative pressure well suited for printing between the recording head and a recording medium. It is further made possible thereby to prevent the ink from leaking by variation in temperature through the ink supply port or through the recording head.

There is usually used in the ink tank valve, an elastic material, for example a plastic base-material to which an elastic material is adhesively bonded. As an elastic material, heat curable rubber has heretofore been used in general. However, there have been problems with the above-mentioned heat curable rubber, that it is difficult to carry out injection molding by means of two-color molding method along with a plastic; that the manufacture of the ink tank valve is expensive; and further that it is difficult to mold and vulcanize the material reduced in hardness into a member having a desired shape and form.

On the other hand, an ink tank for replacement has heretofore been equipped with an elastic member in the form of foam such as polyurethane foam at an ink supply port thereof in order to prevent the ink from leaking therefrom. The elastic member, however, sometimes fails to preserve the ink by preventing the ink leakage during a long period of service. Such being the case, an elastic member excellent in durability has eagerly been sought.

In the case where a recording apparatus is in a non-operational state in an ink-jet recording apparatus, a recording head is allowed to stand by at the end of the main body of the ink-jet recording apparatus. In order to prevent an ink from leaking through the recording head in such standing by, the recording head is accomodated on a sealing member which is arranged along a concave provided on the aforesaid main body of the ink-jet recording apparatus. A heat curable rubber, which is usually used for the sealing member, involves the problem same as the foregoing.

SUMMARY OF THE INVENTION

Under such circumstances, a general object of the present invention is to provide an elastic member composed of a material that is used for an ink-jet recording apparatus, can be injection molded by two-color molding method along with a plastic, can be molded and vulcanized with a material decreased in hardness, has favorable solvent resistance and excellent durability, and is well suited for use in an ink-jet recording apparatus as an ink tank valve which is installed at the position dividing an ink chamber and an ink supply portion, which is moved by the difference in pressure between the ink chamber and the ink supply portion, and which supplies a recording head with the ink filled in the ink chamber, also for use as a sealing member which is installed at an ink supply port, and which prevents the ink from leaking through said ink supply port, and further for use as a sealing member which is installed on the main body of the ink-jet recording apparatus, and which prevents the ink from leaking through the recording head.

Another object of the present invention is to provide an ink tank which makes use of said elastic member.

Still another object of the present invention is to provide an ink-jet recording apparatus which makes use of said elastic member.

As a result of intensive research and investigation accumulated by the present inventors in order to achieve the above-mentioned objects, it has been found that said objects can be achieved by the use of an elastic member which is composed of a material comprising a thermoplastic elastomer constituted of specific block copolymers. The present invention has been accomplished by the foregoing findings and information.

That is to say, the present invention provides an elastic member for an ink-jet recording apparatus that supplies a recording head with an ink and records printed letters on a recording medium, which elastic member is composed of a material comprising at least one copolymer constituted of at least one polymer block containing a vinyl aromatic compound as a principal component and at least one polymer block containing a conjugated diene compound as a principal component.

The present invention further provides an ink tank which is equipped with an ink chamber to be filled in with an ink and an ink supply portion for supplying a recording head with the ink, and which makes use of the aforesaid elastic member.

The present invention still further provides an ink-jet recording apparatus which makes use of said elastic member.

DESCRIPTION OF PREFERRED EMBODIMENT

Figure 1:
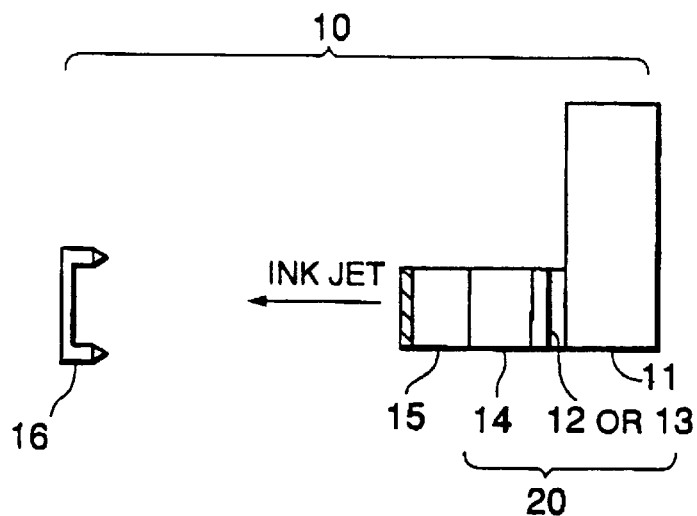
Figure 2:
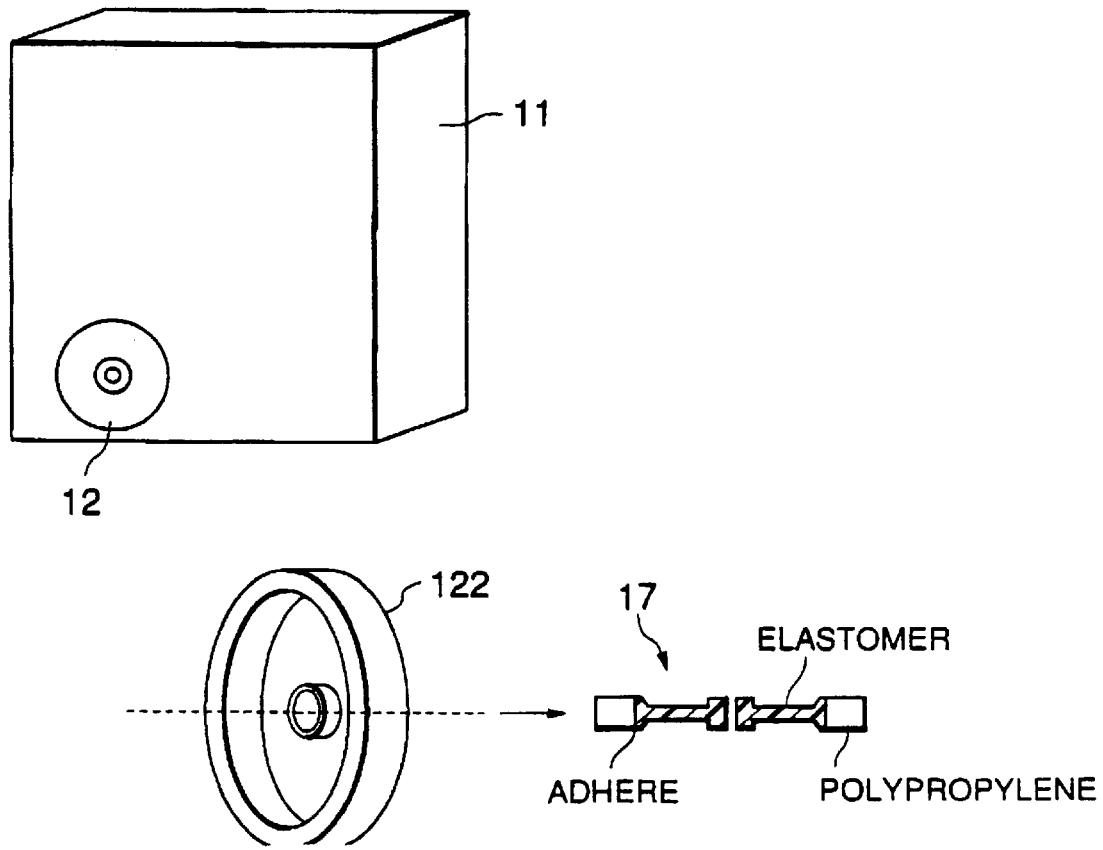
Figure 3:
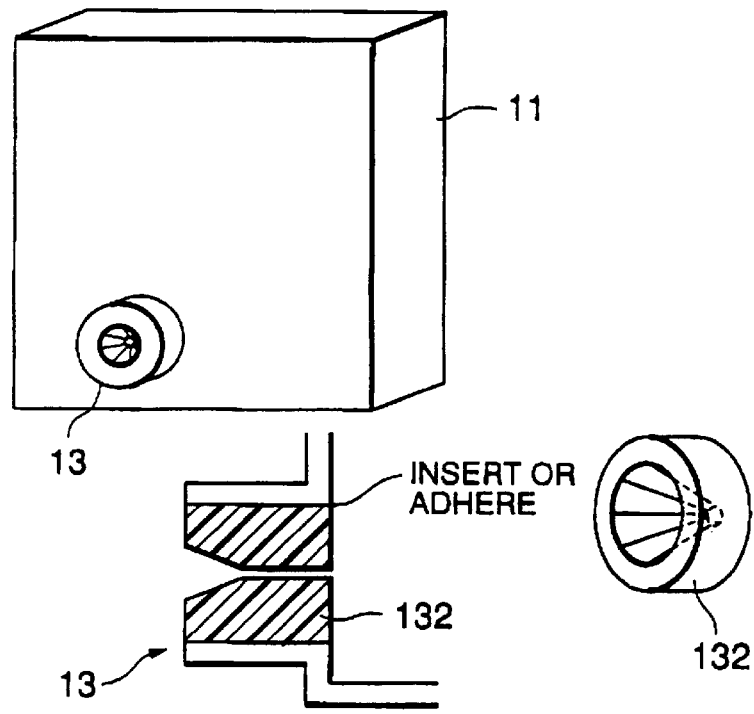
Figure 4:
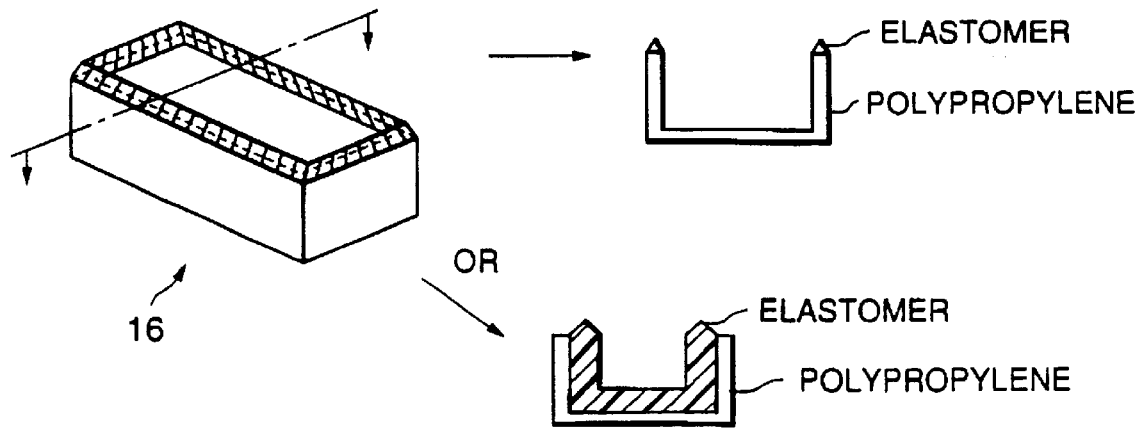

FIGS. 1–4 depict an ink-jet recording apparatus incorporating an embodiment of an elastic member according to the present invention.

FIGS. 1–4 depict an ink-jet recording apparatus (10) which is composed of an ink tank (20), a recording head (15) and a sealing member (16) as a sealing cover for ink-jet head nozzle. The ink tank (20) is composed of an ink chamber (11), an ink tank valve (12) or an ink tank sealing member (13) with an elastomeric insert (132), and an ink supply portion (14). The ink supply portion (14) is a plastic part like a shape of a needle and/or a hose to transport ink. The ink tank valve (12) includes an outer polyprolene part (122) and an elastomer member (7) adhered to the polypropylene part (122) in the ink tank valve (12), which is moved by the difference in pressure between the ink chamber and the ink supply portion. Reference to the elastic member in the present application is used, for example, with respect to the ink tank valve (12), the ink tank sealing member (13), and the sealing member (16).

There is used, as a material for the elastic member in the present invention, a thermoplastic elastomer comprising a copolymer constituted of at least one polymer block containing a vinyl aromatic compound as a principal component and at least one polymer block containing a conjugated diene compound as a principal component (hereinafter referred to as "Thermoplastic material").

Examples of said Thermoplastic material include:

① a block copolymer of crystalline polyethylene and ethylene/butylene-styrene random copolymer, said polyethylene being produced by hydrogenating a block copolymer of polybutadiene and butadiene-styrene random copolymer, and ② (a diblock copolymer of crystalline polyethylene and polystyrene; a triblock copolymer of styrene-ethylene/butylene-styrene (SEBS); a triblock copolymer of styrene-ethylene/propylene-styrene (SEPS); especially block copolymer of styrene-ethylene/butylene-styrene; block copolymer of styrene-ethylene/propylene-styrene, each being produced by hydrogenating a block copolymer of polybutadiene and poly styrene and a block copolymer of polyisoprene and polystyrene or a block copolymer of polybutadiene or ethylene-butadiene random copolymer and polystyrene.

Of these, is preferable in particular, in view of durability when used as an elastic member for an ink tank, a hydrogenated block copolymer which is produced by hydrogenating the block copolymer constituted of at least one polymer block containing a vinyl aromatic compound as a principal component and at least one polymer block containing a conjugated diene compound as a principal component, as is included in item ② and which has a number-average molecular weight of at least 30,000. The upper limit of the number-average molecular weight is not specifically limited, but is usually 400,000, approx.

Of the preferable hydrogenated block copolymer which is produced by hydrogenating the block copolymer constituted of at least one (one segment) polymer block containing a vinyl aromatic compound as a principal component and at least one polymer block containing a conjugated diene compound as a principal component as mentioned hereinbefore, is more preferable, a hydrogenated block copolymer which is produced by hydrogenating the block copolymer having at least two polymer blocks containing a vinyl aromatic compound as a principal component and at least one polymer block containing a conjugated diene compound as a principal component, which block copolymer is exemplified by styrene-butadiene styrene block copolymer and styrene-isoprene styrene block copolymer.

Another preferable hydrogenated block copolymer is that which is similar to the above-exemplified hydrogenated block copolymer, and which is produced by hydrogenating the block copolymer constituted or at least one polymer block containing, as a principal component, a modified vinyl aromatic compound in which a carboxylic acid group or a maleic anhydride group or a molecular unit containing any of these derivative groups is bonded, and at least one polymer block containing a conjugated diene compound as a principal component.

It is desirable that the content of amorphous styrene blocks in the aforesaid block copolymer be in the range of 10 to 70% by weight, preferably 15 to 60% by weight, and also that the glass transition temperature (Tg) of amorphous styrene block segments be 60° C. or higher, preferably 80° C. or higher. Moreover, the polymer at the portion which connects amorphous styrene blocks at both the terminals is also preferably amorphous, is exemplified by an ethylene-butylene copolymer, a butadiene polymer and an isoprene polymer, and may be a block copolymer or a random copolymer thereof. Any of these various thermoplastic elastomer may be used alone or in the form of a blend of at least two components.

A softening agent may be blended as desired in the Thermoplastic material to be used in the present invention for the purpose of reducing the hardness of the aforesaid thermoplastic elastomer. Said softening agent is not specifically limited, but may be arbitrarily selected for use from the softening agents which have heretofore been customarily employed for plastics and rubber. Preferably, the softening agent is a low molecular substance which has a number-average molecular weight of less than 20,000 and physical properties such as a viscosity at 100° C. of $5\times10^5$ centipoise or lower, especially $1\times10^5$ centipoise or lower. From the viewpoint of molecular weight, the softening agent has a number-average molecular weight of preferably less than 20,000, more preferably less than 10,000, particularly preferably less than 5,000. The preferably usable softening agent may be usually a liquid at room temperature or in the form of liquid, and may be hydrophilic or hydrophobic.

The softening agent having such properties can be suitably selected for use for example from the variety of softening agents for rubber or plastics including those of mineral oil base, vegetable oil base and synthetic oil base.

Examples of the mineral oil base include process oils such as naphthenic base oil and paraffinic base oil. Examples of the vegetable oil base include castor oil, cotton seed oil, linseed oil, rapeseed oil, soybean oil, palm oil, coconut oil, arachis oil, Japan wax oil, pine oil, and olive oil. Of these, are preferable an oil and at least two oils each having a number-average molecular weight in the range of 450 to 5000, and being selected from mineral oil based paraffinic oil, naphthenic oil, and synthetic base polyisobutylene base oil.

Any of these softening agents may be used alone or as a component in a mixture of at least two agents, provided a plurality of the agents are well compatible with each other.

The blending amount of any of these softening agents is not specifically limited, but is selected in the range of usually 1 to 1,000 parts by weight, preferably 1 to 500 parts by weight based on 100 parts by weight of the above-mentioned thermoplastic elastomer. An amount of any of these softening agents, when being less than 1 part by weight based thereon, gives rise to a fear of failure to attain sufficient hardness lowering and sufficient flexibility of the Thermoplastic material, whereas an amount thereof, when being more than 1000 parts by weight based thereon, brings about the causes for rendering the softening agent more prone to bleed and for lowering the mechanical strength of the Thermoplastic material. It is preferable that the blending amount of the softening agent be properly selected in the foregoing range in accordance with the molecular weight of the thermoplastic elastomer and the types of the other components that are to be incorporated in said elastomer.

It is preferable, in the Thermoplastic material to be used in the present invention, that the high molecular organic material constituting the same has a three-dimensional continuous network skeleton construction. Moreover, the three-dimensional continuous network skeleton construction to be formed therein has an average diameter of the skeleton of at most 50 μm, preferably at most 30 μm, an average diameter of the cell (network) of at most 500 μm, preferably at most 300 μm, and a volumetric fraction of the high molecular organic material of at most 50%, preferably at most 33%, when the volumetric fraction of the high molecular organic material is defined as: [volume of high molecular organic material/(volume of high molecular organic material+ volume of softening agent)]×100%

In order to obtain the Thermoplastic material containing a larger amount of the softening agent and a smaller amount of the high molecular organic material, it is preferable to select both the softening agent and the high molecular organic material so that the difference in solubility parameter $\delta=(\Delta E/V)^{1/2}$ ($\Delta E$=molar evaporation energy, V=molar volume) therebetween becomes at most 3.0, preferably at most 2.5. The difference exceeding 3.0 is unfavorable, since a large amount of the softening agent is difficult to preserve in view of the compatibility of both the materials and in addition, the softening agent becomes more apt to cause bleeding.

The Thermoplastic material relating to the present invention m ay be blended as desired, with polyphenylene ether resin for the purpose of improving the compression set of the materials. The polyphenylene ether resin to be used therefor is a homopolymer composed of the repeating unit represented by the general formula or a copolymer composed of said repeating unit.

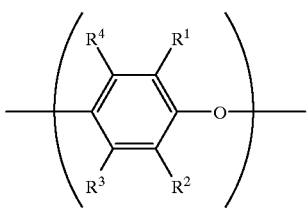

wherein $R^1$, $R^2$, $R^3$ and $R^4$ are each independently of one another, hydrogen atom, a halogen atom or a hydrocarbon group.

The polyphenylene ether resin may be selected for use from the well known ones, and is specifically exemplified by poly(2,6-dimethyl-1,4-phenylene ether); poly(2-methyl-6-ethyl-1,4-phenylene ether); poly(2,6-diphenyl-1,4-phenylene ether); poly(2-methyl-6-phenyl-1,4-phenylene ether); and poly(2,6-dichloro-1,4-phenylene ether). There is also usable a polyphenylene ether copolymer such as the copolymer of 2,6-dimethylphenol and a monohydric phenols (for example, 2,3,6-trimethylphenol and 2-methyl-6-butylphenol). Of these are preferable poly(2,6-dimethyl-1,4-phenylene ether) and the copolymer of 2,6-dimethylphenol and 2,3,6-trimethylphenol, and the former is particularly preferable.

The blending amount of the polyphenylene ether resin is preferably selected in the range of 10 to 250 parts by weight on the basis of 100 parts by weight of the Thermoplastic material. An amount thereof exceeding 250 parts by weight causes a fear that the hardness of the resultant elastomer is unfavorably made excessively high, whereas an amount thereof less than 10 parts by weight unfavorably leads to insufficient effect on the improvement of compression set obtained by the blending.

The Thermoplastic material relating to the present invention may be blended with a flaky inorganic additive such as clay, diatomaceous earth, silica, talc, barium sulfate, calcium carbonate, magnesium carbonate, a metal oxide, mica, graphite and aluminum hydroxide, various metal powders, wooden pieces, glass powder, ceramics powder, granular or powdery solid filler such as granular or powdery polymer, and a variety of natural or artificial short fibers and long fibers (such as straw, glass fiber, metallic fiber and a variety of polymer fibers).

It is possible to contrive weight lightening of the Thermoplastic material by blending therein a hollow filler such as an inorganic hollow filler exemplified by glass balloon and silica balloon, an organic hollow filler composed of polyfluorovinylidene and polyfluorovinylidene copolymer. It is also possible to blend any of various foaming agents in order to improve various properties such as weight lightening of the Thermoplastic material, and it is possible to mechanically mix in a gas at the time of blending.

The Thermoplastic material ralating to the present invention may be incorporated with an additive such as well known resin components in addition to the above-mentioned components in order to improve miscellaneous properties.

As the resin components, polyolefin resin, polystyrene resin or the like can be used alone or in combination therewith. The addition of the aforesaid resin component enables the Thermoplastic material relating to the present invention to be improved in its processability and heat resistance. Examples of the polyolefin resin include polyethylene, isotactic polypropylene, a copolymer of propylene and a small amount of an other α-olefin (for example, propylene-ethylene copolymer and propylene/4-methyl-1-pentene copolymer), poly(4-methyl-1-pentene), and polybutene-1. In the case where isotactic polypropylene or a copolymer thereof is used as polyolefin resin, there is favorably usable a polyolefin resin having a MFR value (according to JIS K7210) in the range of preferably 0.1 to 50 g/10 minutes, particularly preferably 0.5 to 30 g/10 minutes.

Any polystyrene resin can be used in the present invention provided that it is produced by a well known process, no matter whether it is produced by radical polymerization process or ionic polymerization process. The number-average molecular weight of the polystyrene resin is selected in the range of preferably 5,000 to 500,000, more preferably 10.000 to 200,000, and the molecular weight distribution [the ratio of weight-average molecular weight (Mw) to number-average molecular weight (Mn)=(Mw/Mn)] is preferably at most 5.

Examples of the polystyrene resin include polystyrene, styrene-butadiene block copolymer having a styrene unit content of at least 60%, rubber-reinforced polystyrene, poly-α-methylstyrene and poly-p-t-butylstyrene. Any of the above-exemplified polystyrene may be used alone or in combination with at least one other. In addition, there is also usable a copolymer which is obtained by polymerizing the mixture of the monomers constituting any of these polymers.

It is also possible to simultaneously use the above-mentioned polyolefin resin and polystyrene resin. In the case where any of these resins is added to the Thermoplastic material relating to the present invention, the simultaneous use of the polyolefin resin and polystyrene resin has a tendency to increase the hardness of the resultant material as compared with the use of the polyolefin resin alone. Accordingly, the hardness of the resultant Thermoplastic material can be regulated by selecting the blending ratio of these resins. In this case the blending ratio by weight of the polyolefin resin to the polystyrene resin is preferably selected in the range of 95/5 to 5/95.

Any of these resin components, when being used simultaneously with the Thermoplastic material, should be used to the extent that the effect of the present invention is not impaired thereby. Specifically, the blending amount of said resin is preferably in the range of 0 to 100 parts by weight, approx. based on 100 parts by weight of the Thermoplastic material. In particular, the blending amount of the polyolefin resin is preferably in the range of 0.1 to 50 parts by weight based on 100 parts by weight of the Thermoplastic material. The blending amount, when exceeding 100 parts by weight, unfavorably leads to an excessively high hardness at the objective Thermoplastic material. In the case where the polyolefin resin is used as the resin component, the above-mentioned softening agent is preferably blended in an amount of 1 to 500 parts by weight into 100 parts by weight the copolymer (thermoplastic elastomer).

It is possible at need to use simultaneously with the Thermoplastic material, an additive and a thermoplastic elastomer or a resin other than those in the present invention, which are exemplified by flame retardants, antimicrobial agents, hindered amine base light stabilizer, ultraviolet rays absorbers, antioxidants, colorants, silicone oils, silicone polymers, cumarone resin, cumarone indene resin, phenol terpene resin, petroleum base hydrocarbons, various tackifiers such as rosin derivatives, various adhesive-type elastomer such as Rheostomer (trade name, produced by Riken Vinyl Industry Co., Ltd.), Highbler (trade name, produced by Kuraray Co., Ltd., block copolymer in which polystyrene block is bonded to both terminals of vinyl-polyisoprene block) and Nolex (trade name, produced by Nippon Zeon Co., Ltd., poly-norbornene formed by ring opening polymerization of norbornene).

It is desirable that the silicone polymer has a weight average molecular weight of at least 10,000, preferably ably at least 100,000. The above-mentioned silicone polymer, which improves the surface self-adhesiveness of a molded article using a composition, may be used to form a blend in which it is incorporated into for example polyethylene, polypropylene or polystyrene in a high concentration. Of these, a blend with polypropylene is preferable from the aspects of workability as well as physical properties. The silicone polymer may be selected for use from the product of Toray Silicone Co., Ltd. easily available on the market for example, as Silicone Concentrate BY27 series of general-purpose type.

It is possible to improve the surface self-adhesiveness of a molded article by blending the silicone polymer in the Thermoplastic material of the present invention. However, favorable miscibility is not necessarily obtained between the silicone polymer and the copolymer composed of a vinyl aromatic compound block and a conjugated diene compound block. The aforesaid fact is easily anticipatable from the chemical constitutions markedly different from each other. There is a possibility, therefore, of the separation of the silicone polymer depending upon the details of the blend and molding conditions. The likelihood of said separation can be improved by the use of a polymer having a relatively favorable miscibility with the copolymer composed of a vinyl aromatic compound block and a conjugated diene compound block for example, by the use of a graft polymer which is formed by chemically linking the silicone polymer to the polyolefin resin. The above-mentioned improving agent may be selected for use from the product of Toray Silicone Co., Ltd. available on the market as "BY27 series graft type".

The process for producing the Thermoplastic material of the present invention is not specifically limited, but well known processes are applicable thereto. For example, said thermoplastic elastomer is readily producible by a process which comprises the steps of melt kneading the foregoing components and the additives that are used as desired by the use of a heating kneader such as a single screw extruder, a twin screw extruder, a roll, a Banbury mixer, a prabender, a kneader and a high shear type mixer; further adding as desired to the resultant mixture, a crosslinking agent such as an organic peroxide, a crosslinking aid or the like, or simultaneously mixing with the necessary components; and melt kneading by heating the resultant mixture.

The Thermoplastic material can be produced by preparing a preliminary thermoplastic material which is produced by kneading the high molecular organic material and the softening agent, and further mixing the resultant material with at least one high molecular organic material which is similar to or different from that to be used herein.

Moreover, the Thermoplastic material to be used in the present invention can be crosslinked by adding thereto, a crosslinking agent such as an organic peroxide, a crosslinking aid and the like.

Examples of the crosslinking agent which can be added for the purpose of partial crosslinking include an organic peroxide, specifically exemplified by 2,5-dimethyl-2,5-di(t-butylperoxy)-hexane; 2,5-dimethyl-2,5-di(benzoylperoxy)-hexane; t-butylperoxybenzoate; dicumylperoxide; t-butylcumyl peroxide; diisopropylbenzohydroperoxide; 1,3-bis-(t-butylperoxyisopropyl)-benzene; benzoylperodxide; and 1,1-di(t-butylperoxy)-3,3,5-trimethylcyclohexane. Examples of useful crosslinking aid include divinylbenzene; trimetylolpropane triacrylate; ethylene dimethacrylate; diallyl phthalate; quinone dioxime; phenylenebismaleimide; polyetylene glycol dimethacrylate; and an unsaturated silane compound. The above-exemplified organic peroxide and crosslinking aid are each optionally used in an amount of 0.1 to 5 parts by weight based on 100 parts by weight of the whole amount of the blend so as to adjust the degree of crosslinking. It is possible to use two or more kinds as necessary, each of the organic peroxide and crosslinking aid. In the case where an unsaturated silane compound is used as a crosslinking aid, it is possible to proceed with crosslinking by bringing said compound into contact with water in the presence of a silanol condensation catalyst.

The elastic member according to the present invention is constituted of the above-mentioned Thermopolastic material, and is used for an ink tank which is equipped with an ink chamber to be filled in with an ink and an ink supply portion for supplying a recording head with the ink.

The aforesaid elastic member is usable for any part item without specific limitation, provided that it is a part item which requires a elastic member. It is preferable in particular to use the elastic member as an ink tank valve which is installed at the position dividing an ink chamber and an ink supply portion, which is moved by the difference in pressure between the ink chamber and the ink supply portion, and which supplies a recording head with the ink filled in the ink chamber; and to use said member as an sealing member which is installed at an ink supply port of the ink tank and which prevents the ink from leaking through said ink supply port.

By the use of the Thermoplastic material comprising the thermoplastic elastomer such as SEBS and SEPS in the elastic member, the following working effects are exhibited.

The above-mentioned ink tank valve is usually of such a construction that an elastic material is integrally formed on the surface of a plastic base material. In the case of producing a molded article having such a construction, it is advantageous to adopt an injection molding method by two-color molding method which is simple in production procedures and low in the production cost. In contrast to the heat curing rubber which has heretofore been used as the elastic material and difficult in two-color molding, the present invention enables two-color molding and the ink tank valve to be produced at a low cost by the use of the Thermoplastic material comprising the thermoplastic elastomer such as SEBS and SEPS.

It is difficult to mold and vulcanize a material which is reduced in hardness in the conventional heat curing rubber into a member with a desired shape. Notwithstanding the difficulty, the present invention enables the material reduced in hardness to be molded and vulcanized into a member which has a desired shape, moderate elasticity and excellent mechanical properties by the use of the Thermoplastic material comprising the thermoplastic elastomer such as SEBS and SEPS.

In the case of reducing the hardness of the thermoplastic elastomer such as SEBS and SEPS in the Thermoplastic material to be used in the present invention, it is possible to employ as the oil component, a liquid such as a paraffin base oil and the like which is greatly different in polarity from the ink. In addition, the oil component is incompatible with the styrene block which is the agglomeration domain of the thermoplastic elastomer such as SEBS and SEPS, thereby exerting little influence upon the physical properties such as strength of the thermoplastic elastomer. Moreover, by the use of the thermoplastic elastomer such as SEBS and SEPS, it is made possible to afford an ink tank valve and a sealing member for the ink tank which are minimized in variation in properties like swelling due to a solvent such as ink, and which are excellent in durability. The sealing member according to the present invention can be installed at an ink supply port and also at a joint connecting an ink supply portion to a recording head.

The present invention also provides an elastic member composed of a material comprising a thermoplastic elastomer such as SEBS and SEPS, and particularly preferably an ink tank valve and/or an ink tank in which a sealing member of the ink tank is used.

The ink tank according to the present invention needs only that said elastic member is used in the tank without specific limitation. The ink tank may be a tank in which an ink is retained in a foam such as polyurethane foam, and may be a tank without such foam packed therein.

The shapes of the foregoing ink tank valve, and the sealing member for the ink tank, which are not specifically limited, are exemplified by the shape same as that used in the conventional ink tank. As the method for producing the sealing member for an ink tank for example, there can be adopted a conventional well known method such as injection molding, extrusion molding and the like. On the other hand, there can be adopted a two-color molding method for producing the ink tank valve which comprises the steps of melt-injection molding a plastic for example as the base material in a die; and then melt-injection molding the Thermoplastic material relating to the present invention on the surface of the resultant plastic molding so as to integrally laminate said Thermoplastic material on the surface of the plastic molding. Alternatively, there can be adopted an insert molding method for producing the ink tank valve which comprises the steps of melt-injection molding a plastic as the base material in a die; then inserting the resultant molded article in another die; and subsequently melt-injection molding the Thermoplastic material relating to the present invention on the surface of the resultant plastic molding so as to integrally laminate said Thermoplastic material on the surface of the plastic molding.

The elastic member for an ink tank according to the present invention can be injection molded by two-color molding method along with plastics, can be molded and vulcanized with a material decreased in hardness, and further is excellent in solvent resistance and durability. Said elastic member is well suited in particular for use as an ink tank valve which is installed at the position dividing an ink chamber and an ink supply portion, which is moved by the difference in pressure between the ink chamber and the ink supply portion, and which supplies a recording head with the ink filled in the ink chamber; also for use as a sealing member which is installed at an ink supply port of the ink tank and which prevents the ink from leaking through said ink supply port; and further for use as a sealing member which is installed on the main body of the ink-jet recording apparatus and which prevents the ink from leaking through the recording head; and still further for use as a joint connecting an ink supply portion to a recording head.

In the following, the present invention will be described in more detail with reference to a comparative example and working examples, which however shall not limit the present invention thereto. The physical properties in the following working examples, comparative example and reference examples were evaluated in accordance with the methods as described hereinafter.

(1) Hardness of Material

Hardness of material was measured according to JIS K6301 (Type A)

(2) Bleed Amount of Softening Agent

A circular sheet as a sample having a diameter of 25 mm and a thickness of 2 mm was interposed between iron plates, compressed to a sample thickness of 1 mm, and allowed to stand at 70° C. for 48 hours. Thereafter the compressed sample was weighed, the weight thus obtained was subtracted from the weight before the compression, and the remainder after the subtraction was regarded as bleed amount, which was expressed by percentage (%) by weight.

The solubility parameter of copolymer (SP value) was measured by the conventional method. Moreover, the number-average molecular weight of copolymer was measured by gel permeation chromatography [GPC: GMH-XL (two columns in series), produced by Tosoh Corporation], and was expressed in terms of the number-average molecular weight of polystyrene based on monodisperse polystyrene as the standard by the use of a differential refractometer (RI).

EXAMPLES 1 TO 5, COMPARATIVE EXAMPLE AND REFERENCE EXAMPLES 1 AND 2

(1) Preparation of Thermoplastic Material (Raw Material for the Elastic Member of the Ink Tank)

Samples of the Thermoplastic material were prepared by sufficiently kneading each of the components with blending proportions as shown in Table 1, and the physical properties of the resultant blends were evaluated. As a result, as is clear from Table 1, bleed was hardly observed in Examples 1 to 5, whereas much bleed was observed in Comparative Example, and more or less bleed was observed in Reference Examples 1 and 2.

(2) Preparation of Ink Tank Valve

By the use of the Thermoplastic material as obtained in the preceding item (1) an ink tank valve was prepared under the production conditions including a die temperature of 80° C. and a resin temperature of 190° C. The ink tank valve thus prepared was installed at the position dividing an ink chamber and an ink supply portion in the ink tank, and was subjected to an ink supply test and a long-time durability test (120° C., 1000 hours). The results are given in Table 1, in which the mark "○" means that the ink supplied is completely free from pollution due to bleeding, and the ink tank valve sufficiently functions as the valve; the mark "×" means that the ink supplied is polluted by bleeding; and the mark "–" means that any of the test results was unmeasurable.

Consequently, the materials in Examples 1 to 5 satisfied both the required properties (long-time durability as well as ink supply performance), whereas the material in Comparative Example had inferior adhesivity to polypropylene resin, thereby rendering the ink tank valve unusable as a valve, and the materials in Reference Examples 1 and 2 sometimes resulted in observable pollution of ink due to bleed at the time of durability test.

(3) Preparation of Sealing Member for Ink Tank

By the use of the Thermoplastic material as obtained in the preceding item (1), a sealing member for ink tank was prepared under the production conditions including a die temperature of 80° C. and a resin temperature of 170° C. The sealing member thus prepared was installed at the end of the ink supply portion in the ink tank, and was subjected to a long-time durability test (120° C., 1000 hours). The results are given in Table 1, in which the mark "○" means that the ink supplied is completely free from pollution due to bleeding, and that no ink leakage was observed at all through the sealing member; the mark "×" means that the ink supplied is polluted by bleeding; and the mark "−" means that any of the test results was unmeasurable.

Consequently, the materials in Examples 1 to 5 brought about satisfactory long-time durability without any observable ink leakage, whereas the material in Comparative Example had inferior adhesivity to polypropylene resin, thereby rendering itself unusable as a sealing member, and the materials in Reference Examples 1 and 2 sometimes led to observable pollution of ink due to bleed at the time of durability test.

TABLE 1

|  | Example | | | | | Comparative Example | Reference Example 1 | Reference Example 2 |
|---|---|---|---|---|---|---|---|---|
|  | 1 | 2 | 3 | 4 | 5 | | | |
| Blending Proportion (wt. parts) | | | | | | | | |
| Polymer A | 100 | 100 | 100 | | | | | |
| Polymer B | | | | 100 | 100 | | | |
| Polymer C | | | | | | | 100 | 100 |
| NR rubber | | | | | | 100 | | |
| Softening Agent A | 150 | 150 | 125 | 150 | 150 | 8 | 225 | 85 |
| Additive A | 13 | | | 13 | | | 13 | 13 |
| Additive B | | | 25 | | | | | |
| Additive C | | 13 | | | 13 | | | |
| Additive D | | | | | | 30 | | |
| Additive E | | | | | | 5 | | |
| Additive F | | | | 10 | 10 | | 10 | 10 |
| Evaluation | | | | | | | | |
| Material Hardness | 20 | 20 | 30 | 25 | 25 | | 30 | 45 |
| Bleed Amount of Softening Agent (%) | <0.01 | <0.01 | <0.01 | <0.01 | <0.01 | | 0.15 | 0.15 |
| Ink Tank Valve Performance | | | | | | | | |
| Ink Supply Property | ○ | ○ | ○ | ○ | ○ | — | ○ | ○ |
| Durability | ○ | ○ | ○ | ○ | ○ | — | x | x |
| Ink Tank Seal Performance | | | | | | | | |
| Durability | ○ | ○ | ○ | ○ | ○ | — | x | x |

Description of the Blended Components in Examples, Comparative Example and Reference Examples (Table 1)

Polymer A: SEPS polymer having a number-average molecular weight of 100,000 and an SP value of 8.5
Polymer B: SEPS polymer having a number-average molecular weight of 70,000 and an SP value of 8.5
Polymer C: SEBS polymer having a number-average molecular weight of 50,000 and an SP value of 8.5
Softening agent A: paraffin base oil (produced by Idemitsu Kosan Co., Ltd., trade name: PW-380, having a number-average molecular weight of 750 and an SP value of 7.8)
Additive A: polypropylene resin
Additive B: mixture of silicone resin and polypropylene resin in equal amounts
Additive C: silicone polymer grafted onto polypropylene resin
Additive D: carbon black
Additive E: sulfur
Additive F: polyphenylene ether resin

What is claimed is:

1. An elastic member for an ink-jet recording apparatus that supplies a recording head with an ink and records printed letters on a recording medium which elastic member is composed of a material comprising at least one copolymer constituted of at least one polymer block containing a vinyl aromatic compound as a principal component and at least one polymer block containing a conjugated diene compound as a principal component, wherein said material further comprises 1 to 50 parts by weight of a polyolefin resin and 1 to 500 part by weight of a softening agent based on 100 parts by weight of said copolymer.

2. The elastic member for an ink-jet recording apparatus according to claim 1, wherein said copolymer has a number-average molecular weight of at least 30,000.

3. The elastic member for an inkjet recording apparatus according to claim 1, wherein said copolymer is in the form of thermoplastic elastomer selected from the group consisting of styrene-ethylene/butylene-styrene block copolymer (SEBS) and styrene-ethylene/propylene-styrene block copolymer (SEPS).

4. The elastic member for an ink-jet recording apparatus according to claim 1, wherein the polyolefin resin is chemically linked to a silicone polymer.

5. The elastic member for an ink-jet recording apparatus according to claim 1, wherein said material further comprises at least one species selected from the group consisting of polyphenylene ether, inorganic additives, organic additives, inorganic hollow fillers, organic hollow fillers, crosslinking agents and crosslinking aids.

6. An elastic member for an ink-jet recording apparatus that supplies a recording head with an ink and records printed letters on a recording medium which elastic member is composed of a material comprising at least one copolymer constituted of at least one polymer block containing a vinyl aromatic compound as a principal component and at least one polymer block containing a conjugated diene compound as a principal component, wherein said elastic member is configured to be used as an ink tank valve which is adapted to be installed at the position dividing an ink chamber and an ink supply portion, which is moved by the difference in pressure between the ink chamber and the ink supply portion, and which supplies a recording head with the ink filled in the ink chamber, and wherein said material further comprises a composition incorporated with 1 to 50 parts by weight of a polyolefin resin and 1 to 500 parts by weight of a softening agent based on 100 parts by weight of said copolymer.

7. An elastic member for an ink-jet recording apparatus that supplies a recording head with an ink and records printed letters on a recording medium which elastic member is composed of a material comprising at least one copolymer constituted of at least one polymer block containing a vinyl aromatic compound as a principal component and at least one polymer block containing a conjugated diene compound as a principal component, wherein said elastic member is configured to be used in an ink tank as a sealing member which is adapted to be installed at an ink supply port and which prevents the ink from leaking through said ink supply port, and wherein said material further comprises a composition incorporated with 1 to 50 parts by weight of a polyolefin resin and 1 to 500 parts by weight of a softening agent based on 100 parts by weight of said copolymer.

8. An elastic member for an ink-jet recording apparatus that supplies a recording head with an ink and records printed letters on a recording medium which elastic member is composed of a material comprising at least one copolymer constituted of at least one polymer block containing a vinyl aromatic compound as a principal component and at least one polymer block containing a conjugated diene compound as a principal component, wherein said elastic member is configured to be used as a sealing member which is adapted to be installed on the main body of the ink-jet recording apparatus and which prevents the ink from leaking through the recording head, and wherein said material further comprises a composition incorporated with 1 to 50 parts by weight of a polyolefin resin and 1 to 500 parts by weight of a softening agent based on 100 parts by weight of said copolymer.

9. An ink tank which comprises an ink chamber to be filled in with an ink and an ink supply portion for supplying a recording head with the ink, and which makes use of an elastic member as a material of construction, wherein said elastic member is composed of a material comprising at least one copolymer constituted of at least one polymer block containing a vinyl aromatic compound as a principal component and at least one polymer block containing a conjugated diene compound as a principal component.

10. An ink-jet recording apparatus which makes use of an elastic member as a material of construction, wherein said elastic member is composed of a material comprising at least one copolymer constituted of at least one polymer block containing a vinyl aromatic compound as a principal component and at least one polymer block containing a conjugated diene compound as a principal component.

11. The elastic member for an ink-jet recording apparatus according to claim 1, wherein said copolymer has a number-average molecular weight of at least 70,000.

12. The elastic member for an ink-jet recording apparatus according to claim 1, wherein said copolymer is a hydrogenated block copolymer.

13. The elastic member for an ink-jet recording apparatus according to claim 2, wherein said copolymer is a hydrogenated block copolymer.

14. The elastic member for an ink-jet recording apparatus according to claim 3, wherein said copolymer is a hydrogenated block copolymer.

15. The elastic member for an ink-jet recording apparatus according to claim 4, wherein said copolymer is a hydrogenated block copolymer.

16. The elastic member for an ink-jet recording apparatus according to claim 5, wherein said copolymer is a hydrogenated block copolymer.

17. The elastic member for an ink-jet recording apparatus according to claim 6, wherein said copolymer is a hydrogenated block copolymer.

18. The elastic member for an ink-jet recording apparatus according to claim 7, wherein said copolymer is a hydrogenated block copolymer.

19. The elastic member for an ink-jet recording apparatus according to claim 8, wherein said copolymer is a hydrogenated block copolymer.

20. The elastic member for an ink-jet recording apparatus according to claim 11, wherein said copolymer is a hydrogenated block copolymer.

21. The ink tank according to claim 9, wherein said copolymer is a hydrogenated block copolymer.

22. The ink-jet recording apparatus according to claim 10, wherein said copolymer is a hydrogenated block copolymer.

* * * * *